(12) United States Patent
Haegermarck

(10) Patent No.: US 9,939,529 B2
(45) Date of Patent: Apr. 10, 2018

(54) ROBOT POSITIONING SYSTEM

(71) Applicant: Aktiebolaget Electrolux, Stockholm (SE)

(72) Inventor: Anders Haegermarck, Trångsund (SE)

(73) Assignee: Aktiebolaget Electrolux (SE)

( * ) Notice: Subject to any disclaimer, the term of this patent is extended or adjusted under 35 U.S.C. 154(b) by 0 days.

(21) Appl. No.: 14/409,291

(22) PCT Filed: Aug. 23, 2013

(86) PCT No.: PCT/EP2013/067500
§ 371 (c)(1),
(2) Date: Dec. 18, 2014

(87) PCT Pub. No.: WO2014/033055
PCT Pub. Date: Mar. 6, 2014

(65) Prior Publication Data
US 2015/0185322 A1 Jul. 2, 2015

(30) Foreign Application Priority Data
Aug. 27, 2012 (SE) ...................................... 1200514

(51) Int. Cl.
*G06K 9/00* (2006.01)
*G01S 17/06* (2006.01)
(Continued)

(52) U.S. Cl.
CPC ............. *G01S 17/06* (2013.01); *B25J 9/1697* (2013.01); *G01S 17/023* (2013.01); *G01S 17/46* (2013.01);
(Continued)

(58) Field of Classification Search
None
See application file for complete search history.

(56) References Cited

U.S. PATENT DOCUMENTS

| | | | |
|---|---|---|---|
| 1,286,321 A | 12/1918 | Hoover | |
| 1,401,007 A | 12/1921 | Staples | |

(Continued)

FOREIGN PATENT DOCUMENTS

| | | |
|---|---|---|
| CA | 2154758 | 6/1995 |
| CN | 1116818 | 2/1996 |

(Continued)

OTHER PUBLICATIONS

Written Opinion for International Application No. PCT/EP2013/067500 mailed Dec. 10, 2013.
(Continued)

*Primary Examiner* — Sumati Lefkowitz
*Assistant Examiner* — David Perlman
(74) *Attorney, Agent, or Firm* — RatnerPrestia

(57) ABSTRACT

A robot positioning system having a camera, a processing unit and at least a first line laser. The first line laser is arranged to illuminate a space by projecting vertical laser beams within field of view of the camera. The camera is arranged to record a picture of the space illuminated by the vertical laser beams, and the processing unit is arranged to extract, from the recorded picture, image data representing a line formed by the vertical laser beams being reflected against objects located within the space. The processing unit is further arranged to create, from the extracted line, a representation of the illuminated space along the projected laser lines, in respect of which the robot is positioned. Methods of positioning a robot are also provided.

20 Claims, 8 Drawing Sheets

(51) Int. Cl.
*G01S 17/02* (2006.01)
*G01S 17/46* (2006.01)
*G05D 1/02* (2006.01)
*B25J 9/16* (2006.01)

(52) U.S. Cl.
CPC ... *G05D 1/0248* (2013.01); *G05D 2201/0203* (2013.01); *Y10S 901/01* (2013.01); *Y10S 901/47* (2013.01)

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzoid |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koriaragi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Keil |
| 5,518,552 A | 5/1996 | Tanoue |
| 5,534,762 A | 7/1996 | Kim |
| 5,548,511 A | 8/1996 | Bancroft |
| 5,560,077 A | 10/1996 | Crotchett |
| 5,568,589 A | 10/1996 | Hwang |
| 5,621,291 A | 4/1997 | Lee |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peless |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,438,456 B1 | 8/2002 | Feddema |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |

(56) References Cited

U.S. PATENT DOCUMENTS

| | | |
|---|---|---|
| 6,525,509 B1 | 2/2003 | Petersson |
| D471,243 S | 3/2003 | Cioffi |
| 6,532,404 B2 | 3/2003 | Colens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goricalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Hulden |
| 7,207,081 B2 | 4/2007 | Gerber |
| 7,208,892 B2 | 4/2007 | Tondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Hulden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Im |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,403,360 B2 | 7/2008 | Cunningham |
| 7,412,748 B2 | 8/2008 | Lee |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |

(56) References Cited

U.S. PATENT DOCUMENTS

| | | |
|---|---|---|
| 7,480,960 B2 | 1/2009 | Kim |
| D586,959 S | 2/2009 | Geringer |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,566,839 B2 | 6/2009 | Augenbraun |
| 7,556,108 B2 | 7/2009 | Won |
| 7,559,269 B2 | 7/2009 | Rudakevych |
| 7,564,571 B2 * | 7/2009 | Karabassi .......... G01B 11/2504 345/427 |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiapbetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,769,490 B2 | 8/2010 | Abramson |
| 7,774,158 B2 | 8/2010 | Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,113 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Geringer |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,239,992 B2 | 8/2012 | Schnittman |
| 8,244,469 B2 | 8/2012 | Jones |
| 8,255,092 B2 | 8/2012 | Phillips |
| 8,256,542 B2 | 8/2012 | Landry |
| 8,265,793 B2 | 9/2012 | Cross |
| 8,274,406 B2 | 9/2012 | Karlsson |
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Geringer |
| 8,308,529 B2 | 11/2012 | DAmbra |

(56) References Cited

U.S. PATENT DOCUMENTS

| | | |
|---|---|---|
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jonas |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburph |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,603 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karisson |
| 8,515,578 B2 | 8/2013 | Chiappetta |
| 8,516,651 B2 | 8/2013 | Jones |
| 8,525,995 B2 | 9/2013 | Jones |
| 8,526,162 B2 | 9/2013 | Tang |
| 8,527,113 B2 | 9/2013 | Yamauchi |
| 8,528,157 B2 | 9/2013 | Schnittman |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steitz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,732,895 B2 | 5/2014 | Cunningham |
| 8,743,286 B2 | 6/2014 | Hasegawa |
| 8,745,194 B2 | 6/2014 | Uribe-Etxebarria |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,924,042 B2 | 12/2014 | Kim |
| 8,961,695 B2 | 2/2015 | Romanov |
| 8,985,127 B2 | 3/2015 | Konandreas |
| 9,033,079 B2 | 5/2015 | Shin |
| 9,037,396 B2 | 5/2015 | Pack |
| 9,144,361 B2 | 9/2015 | Landry |
| 9,360,300 B2 | 6/2016 | DiBernado |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Porchia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim et al. |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |

(56) References Cited

U.S. PATENT DOCUMENTS

| | | |
|---|---|---|
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | JoeAugenbraun |
| 2007/0114975 A1 | 5/2007 | Cohen |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1* | 11/2007 | Sawasaki ............ G05D 1/0246 700/253 |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0015738 A1 | 1/2008 | Casey |
| 2008/0016631 A1 | 1/2008 | Casey |
| 2008/0037170 A1 | 2/2008 | Saliba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto et al. |
| 2009/0232506 A1 | 9/2009 | Hudson |
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |

(56) References Cited

U.S. PATENT DOCUMENTS

| | | |
|---|---|---|
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0154589 A1 | 6/2011 | Reindle |
| 2011/0181741 A1 | 6/2011 | Jones |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung et al. |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |

(56) References Cited

U.S. PATENT DOCUMENTS

| | | |
|---|---|---|
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh et al. |
| 2014/0016469 A1 | 1/2014 | Ho |
| 2014/0026339 A1 | 1/2014 | Konandreas |
| 2014/0053351 A1 | 2/2014 | Kapoor |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2015/0005937 A1 | 1/2015 | Ponulak |
| 2015/0032259 A1 | 1/2015 | Kim et al. |
| 2015/0039127 A1 | 2/2015 | Matsumoto |
| 2015/0057800 A1 | 2/2015 | Cohen |
| 2015/0197012 A1 | 7/2015 | Schnittman |
| 2015/0206015 A1 | 7/2015 | Ramalingam et al. |
| 2015/0265122 A1 | 9/2015 | Han et al. |
| 2016/0306359 A1 | 10/2016 | Lindhe |

FOREIGN PATENT DOCUMENTS

| | | |
|---|---|---|
| CN | 103027634 | 4/2013 |
| DE | 3536907 | 4/1986 |
| DE | 9307500 | 7/1993 |
| DE | 4211789 | 10/1993 |
| DE | 4340367 | 6/1995 |
| DE | 19849978 | 5/2000 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1441271 | 7/2004 |
| EP | 1331537 | 8/2005 |
| EP | 2050380 | 4/2009 |
| EP | 1969438 | 9/2009 |
| EP | 1395888 | 5/2011 |
| EP | 2316322 | 5/2011 |
| EP | 2296005 | 6/2011 |
| EP | 2251757 | 11/2011 |
| EP | 2417894 | 2/2012 |
| EP | 2438843 | 4/2012 |
| EP | 2561787 | 2/2013 |
| EP | 2578125 | 4/2013 |
| EP | 2583609 | 4/2013 |
| EP | 2604163 | 6/2013 |
| EP | 2447800 | 4/2014 |
| EP | 2741483 | 6/2014 |
| EP | 2772815 | 9/2014 |
| FR | 2999416 | 6/2014 |
| GB | 2355523 | 4/2001 |
| GB | 2382251 | 5/2003 |
| GB | 249446 | 3/2013 |
| GB | 1447943 | 10/2013 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 A | 5/1988 |
| JP | 63181727 | 7/1988 |
| JP | 63241610 | 10/1988 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05224745 | 4/1993 |
| JP | 05189041 | 7/1993 |
| JP | 05228090 | 9/1993 |
| JP | 064133 | 1/1994 |
| JP | 0683442 A | 3/1994 |
| JP | 06125861 | 5/1994 |
| JP | 06144215 | 5/1994 |
| JP | 06179145 | 6/1994 |
| JP | 075922 | 1/1995 |
| JP | 0759695 | 3/1995 |
| JP | 07129239 A | 5/1995 |
| JP | 07281742 | 10/1995 |
| JP | 08326025 | 12/1995 |
| JP | 08089455 | 4/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002182742 A | 6/2002 |
| JP | 2002287824 A | 10/2002 |
| JP | 2002355204 | 12/2002 |
| JP | 2002366228 | 12/2002 |
| JP | 2003280740 | 10/2003 |
| JP | 2004166968 | 6/2004 |
| JP | 2004198212 | 7/2004 |
| JP | 2004303134 A | 10/2004 |
| JP | 2005040597 a | 2/2005 |
| JP | 2005124753 A | 5/2005 |
| JP | 2005141636 A | 6/2005 |
| JP | 2006087507 | 4/2006 |
| JP | 2006185438 A | 7/2006 |
| JP | 2006231477 | 9/2006 |
| JP | 2006314669 | 11/2006 |
| JP | 2007143645 A | 6/2007 |
| JP | 2007213236 A | 8/2007 |
| JP | 2007226322 A | 9/2007 |
| JP | 2007272665 A | 10/2007 |
| JP | 2008146617 A | 6/2008 |
| JP | 2008290184 | 12/2008 |
| JP | 2009509220 | 3/2009 |
| JP | 2009193240 A | 8/2009 |
| JP | 2010507169 A | 3/2010 |
| JP | 2010079869 A | 4/2010 |
| JP | 2010526594 | 8/2010 |
| JP | 2011045694 | 3/2011 |
| JP | 2011253361 A | 12/2011 |
| JP | 2012216051 A | 11/2012 |
| JP | 2013089256 | 5/2013 |
| KR | 2004009253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 03022120 | 3/2003 |
| WO | 03024292 | 3/2003 |
| WO | 03026474 A2 | 4/2003 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |

(56) References Cited

FOREIGN PATENT DOCUMENTS

| WO | 2013157324 | 10/2013 |
|---|---|---|
| WO | 2014033055 | 3/2014 |
| WO | 2015016580 | 2/2015 |

OTHER PUBLICATIONS

International Search Report for International Application No. PCT/EP2013/067500 mailed Dec. 10, 2013.
Michael Carsten Bosse, "Atlas: A Framework for Large Scale Automated Mapping and Localization", Massachusetts Institute of Technology, Feb. 2004, Part 1, 140 pages.
Michael Carsten Bosse, "Atlas: A Framework for Large Scale Automated Mapping and Localization", Massachusetts Institute of Technology, Feb. 2004, Part 2, 67 paces.
"SM51 Series Opposed Mode Sensors, DC sensors with metal housings: SM51EB/RB, SM51EB6/RB6," Banner Engineering Corporation, pp. 1-24.
Andersson, et al., "ISR: An Intelligent Service Robot", Centre for Autonomous Systems, Royal Institute of Technology, S-100 44 Stockholm, Sweden, pp. 1-24.
Berlin, et al. "Development of a Multipurpose Mobile Robot for Concrete Surface Processing", A Status Report, Feb. 1992, Sweden, pp. 1-10.
Borenstein, et al. "Real-Time Obstacle Avoidance for Fast Mobile Robots", IEEE, Jan. 6, 1996, pp. 1-18.
Braunstingl, et al, "Fuzzy Logic Wall Following of a Mobile Robot Based on the Concept of General Perception", ICAR '95, 7th International Conference on Advanced Robotics, an Feliu De Guixols, Spain pp. 367-376., Sep. 1995, pp. 1-9.
Caselli, et al. "Mobile Robot Navigation in Enclosed Large-Scale Space", Italy and U.S.A., pp. 1-5.
Cassens, et al. "Finishing and Maintaining Wood Floors" Wood Finishing, North Central Regional Extension Publication #136, pp. 1-8
Collins , et al. "Cerebellar Control of a Line Following Robot", Computer Science and Electrical Engineering Department, University of Queensland, St. Lucia, Queensland, 4072 A. pp. 1-6.
Doty, et al. "Sweep Strategies for a Sensory-Driven, Behavior-Based Vacuum Cleaning Agent", 1993, Machine Intelligence Laboratory-Gainesville Fionda, AAAI 1993 Fail Symposium Series-Research Triangle Park- Raleigh, NC, Oct. 22-24, 1993, pp. 1-6.
Everett, Sensors for Mobile Robots Theory and Application, A.K. Peters, 1995, Chapters 1 and 3.
Everett, Sensors for Mobile Robots Theory and Application, A.K. Peters, Ltd., 1995, Chapters, 4 and 5.
Everett, Sensors for Mobile Robots Theory and Application, A.K. Peters, Ltd., 1995, Chapters 6, 7 and 10.
Everett, Sensors for Mobile Robots Theory and Application, A.K. Peters, Ltd., 1995, Chapters 15 and 16.
Everett, et al, "Survey of Collision Avoidance and Ranging Sensors for Mobile Robots", Revision 1, Technical Report 1194, Dec. 1992, pp. 1-154.
Gavrilut, et al., "Wall-Following Method for an Autonomous Mobile Robot using Two IR Sensors", 12th WSEAS International Conference on Systems, Heraklion, Greece, Jul. 22-24, 2008, ISBN: 978-960-6766-83-1, ISSN: 1790-2769, pp. 205-209.
Herbst, et al., "Micromouse Design Specifications", Jun. 2, 1998, pp. 1-22.
International Preliminary Report on Patentability for International Application No. PCT/EP2013/077377, dated Jun. 21,2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report on Patentability for International Application No. PCT/EP2013/077657, dated Jun. 21, 2016, 7 pages.
International Preliminary Report on Patentability for International Application No. PCT/EP2013/077661, dated Jun. 21, 2016, 11 pages.
International Preliminary Report on Patentability for International Application No. PCT/EP203/077380, dated Jun. 21, 2016, 6 pages.
International Search Report and Written Opinion of the international Searching Authority for International Application No. PCT/Ep2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No, PCT/EP2013/077380, dated Jul. 28, 2014, 8 pages.
International Search Report and Written Opinion of the International Searching Authority for International Application No. PCT/EP2013/077384, dated Aug. 14, 2016, 9 pages.
International Search Report and Written Opinion of the International Searching Authority for International Application No. PCT/EP2013/077385, dated May 27, 2015, 9 pages.
International Search Report and Written Opinion of the International Search Authority for International Application No. PCT/EP2013/077386, dated Sep. 17, 2014, 9 pages.
International Search Report and Written Opinion of the international Searching Authority for International Application No. PCT/EP2013/077387, dated Sep. 30, 2014, 12 pages.
International Search Report and Written Opinion of the International International Application No. PCT/EP2013/077661, dated Jun. 10, 2014, 15 pages.
International Search Report and Written Opinion of the International Searching Authority for International Application No. PCT/EP32013/077657, dated Aug. 18, 2014, 10 pages.
International Search Report for International Application No. PCT/EP2013/057814 dated Dec. 20, 2013.
International Search Report for International Application No. PCT/EP2013/057815 dated Apr. 2, 2014.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to Implementation, Second Edition, A.K. Peters, Ltd., 1999, Chapters 6 and 9.
Jones et al. Mobile Robots Inspiration to Implementation, Second Edition, A.K. Peters, Ltd., 1999, Chapters 1 and 5.
Jones et al., Mobile Robots Inspiration to Implementation, Second Edition, A.K. Peters, Ltd., 1999, Chapters 10 and 11.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences", Journal of Robotic Systems 17 (10), 2000, pp. 549-564.
Kube. "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana, CA, pp. 1-8.
Maaref, et al. "Sensor-based navigation of a mobile robot in an indoor environment", Robotics and Autonomous Systems, 2002, Elsevier.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.

(56) References Cited

OTHER PUBLICATIONS

Saffiotti, "Fuzzy logic in Autonomous Robot Navigation", a case study, Nov. 1995 Revised: Aug. 1997, IRIDIA, Universite Libre de Bruxelles, Belgium, Technical Report TR/IRIDIA/ 95 25, Cover page + pp. 1-14.
Yamamoto. "SOZZY: A Hormone-Driven Autonomous Vacuum Cleaner", From: AAAI Technical Report F3-93-03, Matasushda Research Institute, Tokyo, and MIT Artificial Intelligence laboratory, Massachusetts, pp. 116-124 + Figure 9 and Figure 11.
International Search Report and Written Opinion of the International Searching Authority for International Application No. PCT/EP2014/069073, dated May 12, 2015, 10 pages.
International Search Report and Written Opinion of the International Searching Authority for International Application No. PCT/EP2014/069074, dated May 11, 2015, 9 pages.
Non Final Office Action for U.S. Appl. No. 15/101,257, dated Feb. 10, 2017, 10 pages.
Extended European Search Report for European Application No. 16176479.0, dated Nov. 11, 2016, 9 pages.
Non Final Office Action for U.S. Appl. No. 15/101,235 dated Apr. 21, 2017, 10 pages.
Final Office Action for U.S. Appl. No. 15/100,667, dated Apr. 21, 2017, 26 pages.
Non Final Office Action for U.S. Appl. No. 15/100,667, dated Sep. 12, 2016, 24 pages.
International Search Report and Writtent Opinion of the International Searching Authority for International Application No. PCT/EP2014/078144, 7 pages.
Japanese Office Action for Japanese Application No. 2016-506795, dated Feb. 7, 2017 with translation, 6 pages.
Chinese Office Action for Chinese Application No. 20130075510.9, dated Feb. 6, 2017 with translation, 14 pages.
Japanese Office Action for Japanese Application No. 2016-506794, dated Feb. 7, 2017 with translation, 10 pages.
Chinese Office Action for Chinese Application No. 201380075503.9, dated Febraury 13, 2017 with translation, 18 pages.
Interational Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 19 pages.
International Search Report and Written Opinion of the International Searching Authority for Internatonal Applicaion No. PCT/EP2014/0077142, dated Sep. 11, 2015, 8 pages.
Chung et al., "Path Planning For A Mobile Robot With Grid Type World Model", Proceedings of the 1992 IEEE/RSJ International Conference on Intelligent Robots and Systems, Jul. 7-10, 1992, pp. 439-444.
Non Final Office Action for U.S. Appl. No. 15/101,212, dated May 17, 2017, 8 pages.
Japanese Office Action forApplication for Japanese Application No. 2015-528969, dated Apr. 7, 2017 with translation, 4 pages.
Notice of Allowance for U.S. Appl. No. 15/101,257, dated Jul. 6, 2017, 9 pages.
Non Final Office Action for U.S. Appl. No. 15/102,015, dated Aug. 17, 2017, 13 pages.
International Search Report and Written Opinion of the International Searching Authority for International Application No. PCT/EP2015/058377, dated Aug. 10, 2016, 15 pages.
Japanese Office Action for Application for Japanese Application No. 2015-528969, dated Apr. 7, 2017 with translation, 4 pages.
Notice of Reasons for Rejection for Japanese Application No. 2016-526764, dated Aug. 25, 2017 with translation, 6 paes.
Notification fo Reasons for Rejection for Japanese Application No. 2016-526765, dated Aug. 25, 2017 with translation, 7 pages.
Notifcation of Reasons for Refusal for Japanese Application No. 2016-526756, dated Aug. 10, 2017 with translation, 6 pages.
Notification of Reasons for Refusal for Japanese Application No. 2016-526759, dated Aug. 24, 2017 with translation, 9 pages.
Chinese Office Action for Chinese Application No. 201380075510.9, dated Oct. 27, 2017 with translation, 13 pages.
Notification of Reasons for Refusal for Japanese Application No. 2016-526945, dated Oct. 31, 2017 with translation, 8 pages.
Notification of Reasons for Refusal for Japanese Application No. 2016-526875, dated Oct. 31, 2017 with translation, 10 pages.
Notification of Reasons for Rejection for Japanese Application No. 2016-526947, dated Sep. 21, 2017 with translation, 8 pages.
Non Final Office Action for U.S. Appl. No. 15/101,235, dated Nov. 1, 2017, 11 pages.
Non Final Office Action for U.S. Appl. No. 15/100,667, dated Nov. 29, 2017, 22 pages.
Non Final Office Action for U.S. Appl. No. 14/784,106, dated Oct. 19, 2017, 11 pages.
Final Office Action for U.S. Appl. No. 15/101,212, dated Oct. 11, 2017, 7 pages.
Notice of Allowance for U.S. Appl. No. 15/102,015, dated Dec. 11, 2017, 8 pages.

\* cited by examiner

ROBOT POSITIONING SYSTEM

This application is a U.S. National Phase application of PCT International Application No. PCT/EP2013/067500, filed Aug. 23, 2013, and claims the benefit of Swedish Application No. SE 1200514-6, Aug. 27, 2012, both of which are incorporated herein by reference.

TECHNICAL FIELD

The present invention relates to a robot positioning system and a method of positioning a robot.

BACKGROUND

In many fields of technology, it is desirable to use robots with an autonomous behaviour such that they freely can move around a space without colliding with possible obstacles.

As an a example, robotic vacuum cleaners exist in the art with the capability of more or less autonomously vacuum cleaning a room in which furniture such as tables and chairs and other obstacles such as walls and stairs are located. Traditionally, these robotic vacuum cleaners have navigated a room by means of using e.g. ultrasound or light waves. Further, the robotic vacuum cleaners typically must be complemented with additional sensors, such as stair sensors, wall-tracking sensors and various transponders to perform accurately.

A large number of prior art robot vacuum cleaners use a technology referred to as Simultaneous Localization and Mapping (SLAM). SLAM is concerned with the problem of building a map of an unknown environment by a mobile robot while at the same time navigating the environment using the map. This is typically combined with a horizontally scanning laser for range measurement. Further, odometry is used to provide an approximate position of the robot as measured by the movement of the wheels of the robot.

U.S. 2002/0091466 discloses a mobile robot with a first camera directed toward the ceiling of a room for recognizing a base mark on the ceiling and a line laser for emitting a linear light beam toward an obstacle, a second camera for recognizing a reflective linear light beam from the obstacle. The line laser emits a beam in the form of straight line extending horizontally in front of the mobile robot.

SUMMARY

An object of the present invention is to solve, or at least mitigate these problems in the art and provide an improved robot positioning system.

This objective is attained in a first aspect of the present invention by a robot positioning system comprising a camera, a processing unit and at least a first line laser. The first line laser is arranged to illuminate a space by projecting vertical laser lines within field of view of the camera. The camera is arranged to record a picture of the space illuminated by the vertical laser lines, and the processing unit is arranged to extract, from the recorded picture, image data representing a line formed by the vertical laser lines being reflected against objects located within the space. The processing unit is further arranged to create, from the extracted line, a representation of the illuminated space along the projected laser lines, wherein the robot is positioned with respect to said representation.

This object is attained in a second aspect of the present invention by a method of positioning a robot. The method comprises the steps of illuminating a space with at least a first line laser projecting vertical laser lines within field of view of a camera, and recording, with the camera, a picture of the space illuminated by the vertical laser lines. Further, the method comprises the steps of extracting, from the recorded picture, image data representing a line formed by the vertical laser lines being reflected against objects located within the space, and creating, from the extracted line, a representation of the illuminated space along the projected laser lines, wherein the robot is positioned with respect to said representation.

Advantageously, the robot positioning system according to embodiments of the present invention creates a representation of the environment in which the system is set to operate by recording image data being a result of light reflected against objects located within the illuminated environment. A prior art positioning sensor normally executes thousands of measurements every second in order to produce large amounts of data that must be processed for positioning the robot on which the positioning sensor is arranged. To the contrary, the robot positioning system of the present invention executes an equal amount of measurements, but only uses a small amount of the resulting data for positioning. The robot positioning system of the present invention only considers image data recorded along a planar surface achieved by the vertical laser lines projected by the line laser. This difference compared to prior art positioning sensors is even more stressed in case the environment for which a representation is to be created contains many objects, since every small detail will be represented by processing a relatively small amount of image data. In contrast to many prior art robot positioning systems, no floor sensor is required for e.g. preventing the robot from accidentally falling down a stair.

Further advantageous is that the robot positioning system can be used to detect dust and debris in front of a robotic vacuum cleaner on which the positioning system can be arranged. Even small particles on the floor illuminated by the line lasers will reflect considerably more light then a clean floor and can easily be detected by recording variation of the reflected light.

Yet another advantage is that even without undertaking a complex analysis of the picture and building a complete representation of the environment, pixel/image data of a recorded picture can be used directly to detect obstacles, edges and walls. Each pixel can be regarded as an obstacle detector for a small point in space, and every pixel detecting laser light can easily be translated to how much further the robot can move until it hits an object. Thus, the robot positioning system according to embodiments of the present invention enables provision of accurate and relevant data to navigate past obstacles at close distance.

In a further embodiment of the present invention, the robot positioning system further comprises a second line laser arranged to illuminate the space within field of view of the camera by projecting vertical laser lines. In this particular embodiment, the process unit is arranged to extract, from the recorded picture, image data representing a respective line formed by the vertical laser lines of the first and second line laser being reflected against an object located in the space. Further, the processing unit is arranged to create, from the respective extracted line, a representation of the illuminated space along the projected laser lines of the first and second line laser.

Advantageously, in case of using two light sources, positioning accuracy is improved, and the recorded pictures will contain more information for facilitating the creation of a detailed representation of the environment in which the robot positioning system operates.

In a further embodiment of the present invention, the first and second line lasers are arranged on a respective side of the camera along an axis being perpendicular to an optical axis of the camera. Advantageously, with this arrangement, the respective line laser can be mounted as far as possible from the camera, thus illuminating a greatest possible space.

In yet another embodiment of the present invention, an optical filter is arranged at the camera, which optical filter is adapted to a wavelength of the light emitted by the first (and second) line laser. Advantageously, the camera can be made sensitive to the particular wavelength used by the line laser(s), thus only recording reflected light from the line lasers.

In one embodiment, the camera is a Complementary Metal Oxide Semiconductor (CMOS) camera.

In still another embodiment of the present invention, the robot positioning system is arranged to be rotatable around a vertical axis. This can be achieved by having the robot positioning system fixedly mounted to the robotic vacuum cleaner and rotating the vacuum cleaner, or by having the robot positioning system rotatably mounted to the robotic vacuum cleaner. Advantageously, the robot positioning system can be set to rotate and the camera will record pictures of the complete environment in which the vacuum cleaner is set to operate. A complete representation of the environment can thus be attained.

In yet another embodiment of the present invention, the robot navigation system further comprises a positioning system for estimating an instantaneous position of the robot positioning system. This is advantageous since an origin of coordinates can be established for each recorded picture, and thus ultimately for the created representation.

In a further embodiment of the present invention, the image data is mapped to a coordinate system of a sensor array of the camera. Advantageously, each image feature of a recorded picture can thus be associated with a unique coordinate by utilizing the sensor array coordinate system. The created representation will thus be associated with a coordinate system for facilitating positioning of the robotic vacuum cleaner.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. It should be noted that the robot navigation system according to embodiments of the present invention uses SLAM for positioning. SLAM is well known in the art and will not be discussed in any further detail.

Figure 1:
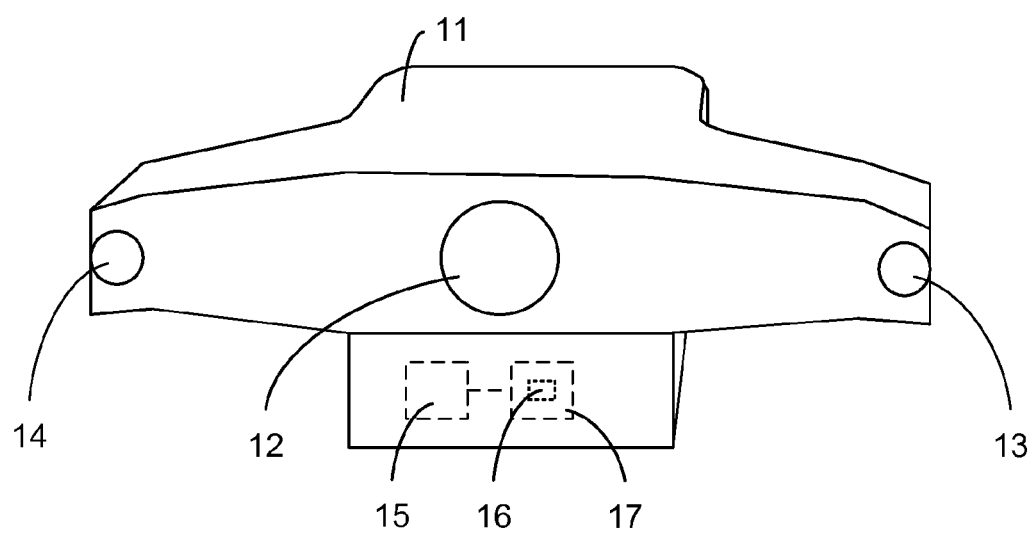
FIG. 1 shows a robot positioning system according to an embodiment of the present invention.

FIG. 1 shows a robot positioning system according to an embodiment of the present invention. The robot positioning system 10 comprises a chassis 11 in which a light detector 12 such as a CMOS camera is located as well as two light sources 13, 14 in the form of line lasers. The line lasers 13, 14 are arranged to project vertical laser lines within field of view of the CMOS camera 12. The CMOS camera 12 will repeatedly record pictures of the space illuminated by the two line lasers 13, 14 such that a representation of the illuminated space can be created for accurate positioning. It should be noted that in an embodiment of the present invention, the robot positioning system comprises a single light source. However, in case of using two light sources, positioning accuracy is improved, and the recorded pictures will contain more information for facilitating the creation of a detailed representation of the environment in which the robot positioning system operates. Throughout the description, the use of two line lasers will be described.

Data processing and derivation of a representation of the illuminated space is typically performed by a processing unit 15 embodied in the form of one or more microprocessors arranged to execute a respective computer program 16 downloaded to a suitable storage medium 17 associated with the microprocessor, such as a Random Access Memory (RAM), a Flash memory or a hard disk drive. The processing unit 15 is arranged to at least partly carry out the method according to embodiments of the present invention when the appropriate computer program 16 comprising computer-executable instructions is downloaded to the storage medium 17 and executed by the processing unit 15. The storage medium 17 may also be a computer program product comprising the computer program 16. Alternatively, the computer program may be transferred to the storage medium by means of a suitable computer program product, such as a floppy disk or a memory stick. As a further alternative, the computer program 16 may be downloaded to the storage medium 17 over a network. The processing unit 15 may alternatively be embodied in the form of an application specific integrated circuit (ASIC), a field-programmable gate array (FPGA), a complex programmable logic device (CPLD), etc. It should further be noted that in case the robot positioning system 10 is integrated with a device such as a robotic vacuum cleaner, the robot positioning system may utilize the microprocessor already available in the vacuum cleaner.

The robot positioning system 10 is typically mounted onto an appliance such as a robotic vacuum cleaner or floor washer. When mounted onto a robotic appliance, the robot positioning system is in an embodiment of the present invention arranged such that it can rotate around a vertical axis. This can be achieved by having the robot positioning system 10 fixedly mounted to the robotic vacuum cleaner and rotating the vacuum cleaner, or by having the robot positioning system 10 rotatably mounted to the robotic vacuum cleaner.

Figure 2A:
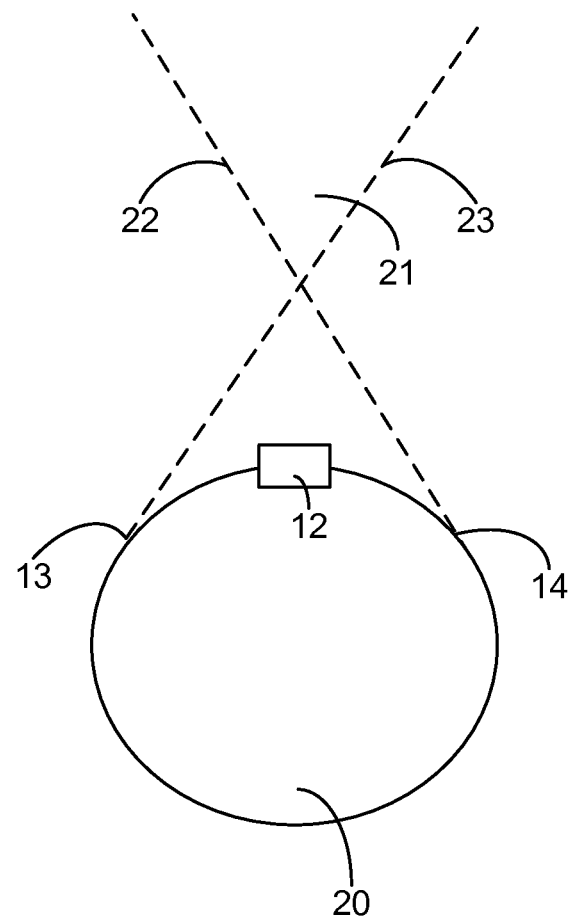
FIG. 2a shows a top view of a robotic vacuum cleaner being arranged with a robot positioning system according to an embodiment of the present invention.

FIG. 2a illustrates a top view of a robotic vacuum cleaner 20 being arranged with a robot positioning system according to an embodiment of the present invention, where the two line lasers 13, 14 each illuminate a space 21 being located in the field of view of the CMOS camera 12 by means of vertical laser lines 22, 23. The respective line laser 13, 14 should be mounted as far as possible from the CMOS camera 12, thus illuminating a greatest possible space 21. Further, the robot positioning system should be placed as high as possible on the robotic vacuum cleaner to create the best overview of the environment in which the robotic vacuum cleaner is to operate.

With a CMOS camera 12 and at least one line laser 13, 14, every picture taken with the camera can be used to create a representation of a part of the illuminated space along the emitted laser beams 22, 23. As the robot positioning system and/or the complete robotic vacuum cleaner onto which the robot positioning system is mounted moves and rotates, the camera 12 repeatedly takes pictures which contains information from which image data can be derived in order to create a representation of the environment located within the space 21 illuminated by the lasers. In an embodiment, rotating the robot positioning system 360 degrees while repeatedly taking pictures will create a plurality of pictures containing information in the form of image data from which an extremely detailed representation of the geometry of the environment can be created.

The CMOS camera 12 can also be used to locate beacons and transponders in the environment as long as they emit with the same wavelength as the laser.

Robotic vacuum cleaners must be capable of moving freely about a space and are thus battery-driven. It should be noted that there is no need for an active beacon on the charging station of the vacuum cleaner of the present invention, since the charging station can be identified and located by its shape or a specific reflecting pattern on its front.

Figure 2B:
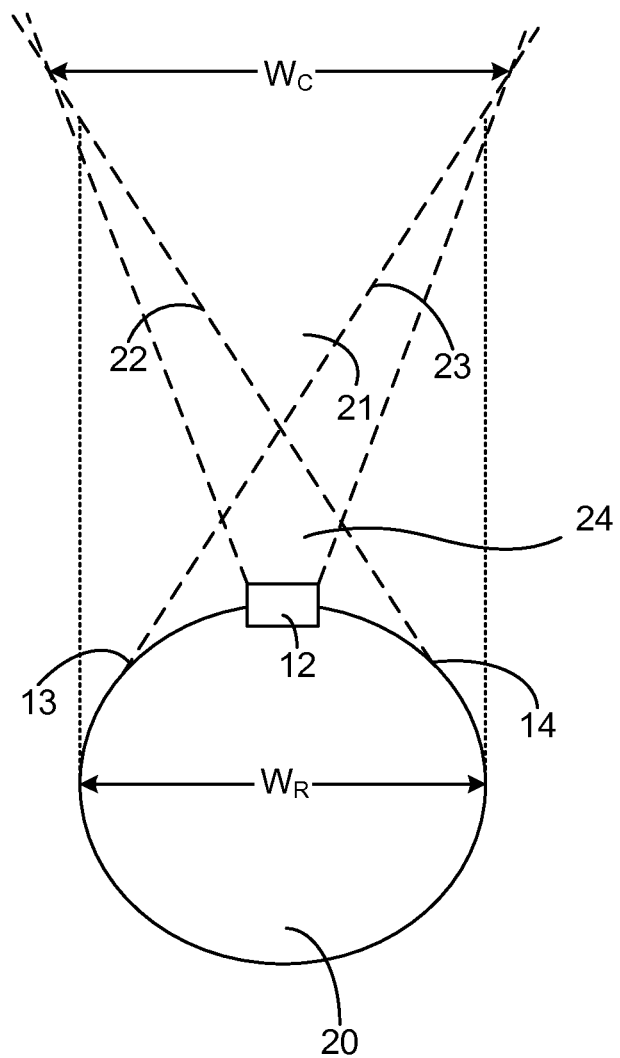
FIG. 2b shows the top view of FIG. 2a with field of view of the camera indicated according to an embodiment of the present invention.

FIG. 2b illustrates a top view of a robotic vacuum cleaner 20 being arranged with a robot positioning system according to an embodiment of the present invention, where the two line lasers 13, 14 each illuminate a space 21 being located in the field of view of the CMOS camera 12 by means of vertical laser lines 22, 23.

As in FIG. 2a, the first line laser 13 and the second line laser 14 are arranged on a respective side of the camera 12 along an axis being perpendicular to an optical axis of the camera. Further, as can be seen in FIGS. 2a and 2b, the line lasers 13, 14 are directed such that their respective laser beams 23, 22 intersect within the field of view of the camera 12. Typically, the intersection coincides with the optical axis of the camera 12.

Advantageously, directional configuration of the line lasers 13, 14 and field of view 24 of the camera 12 are arranged such that the width $w_C$ of the illuminated space 21 located within the field of view 24 of the camera 12 is greater than the width $w_R$ of the robotic vacuum cleaner 20. Hence, the line lasers 13, 14 are directed such that the camera 12 having a selected field of view 24 is able to capture an illuminated space 21 having a width $w_C$ greater than the width $w_R$ of the robotic vacuum cleaner 20. This is useful for detecting obstacles, since the robot 20 is able to perceive obstacles appearing at least along its complete width $w_R$.

Figure 2C:
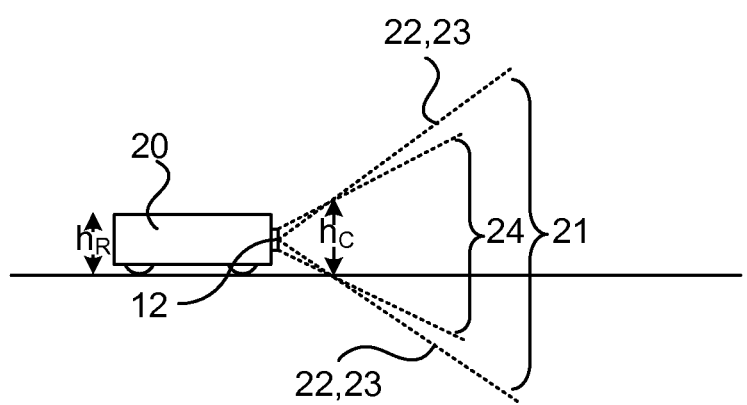
FIG. 2c shows a side view of a robotic vacuum cleaner arranged with a robot positioning system according to an embodiment of the present invention.

FIG. 2c illustrates a side view of the robotic vacuum cleaner 20 shown in FIGS. 2a and 2b arranged with a robot positioning system according to an embodiment of the present invention. In analogy with that set forth in connection to FIG. 2b, the directional configuration of the line lasers causing the laser beams 22, 23 and the field of view 24 of the camera 12 are advantageously arranged such that the height $h_C$ of the illuminated space 21 which is located within the field of view 24 of the camera 12 is greater than the height $h_R$ of the robotic vacuum cleaner 20. Hence, the line lasers are directed such that the camera 12 having a given field of view 24 is able to capture an illuminated space 21 having a height $h_C$ greater than the height $h_R$ of the robotic vacuum cleaner 20. Again, this is useful for detecting obstacles, since the robot 20 is able to perceive obstacles appearing at least along its complete height $h_R$.

In a further embodiment of the present invention, the robot positioning system of the present invention comprises a dust sensor for detecting dust, debris and/or particles illuminated by the line lasers 13, 14. The dust sensor may in practice be implemented by the previously discussed microprocessor 15 executing an appropriate computer program for attaining dust sensing functionality in a robotic vacuum cleaner being equipped with robot positioning system. Thus, the line lasers 13, 14 illuminates a space 21 of which the camera records pictures. From these pictures, image data may be extracted clearly indicating the illuminated particles. In case the robotic vacuum cleaner encounters an area comprising particles, these will light up, and may thus be distinguished from a clean, particle-free floor by using image processing. The robotic vacuum cleaner may thus advantageously be controlled on the basis of this information. For instance, suction capacity may temporarily be increased when passing over an area comprising a great number of particles, or the vacuum cleaner may be controlled to go over the area a couple of times to ensure that all dust and debris are removed.

Figure 3A:
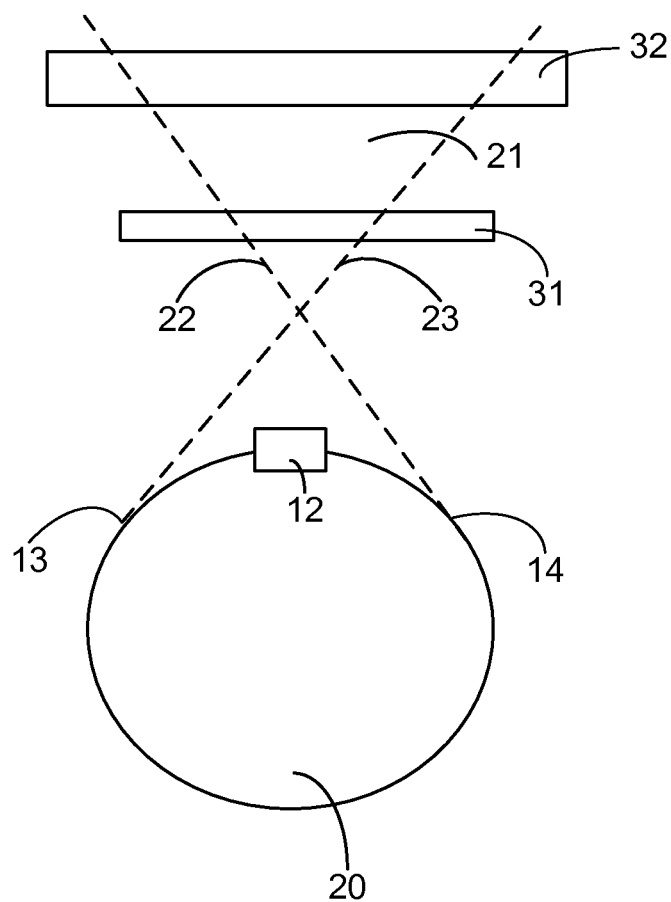
FIGS. 3a and 3b illustrate a procedure of creating a representation of the environment in which a robot operates by using the robot positioning system according to an embodiment of the present invention.
Figure 3B:
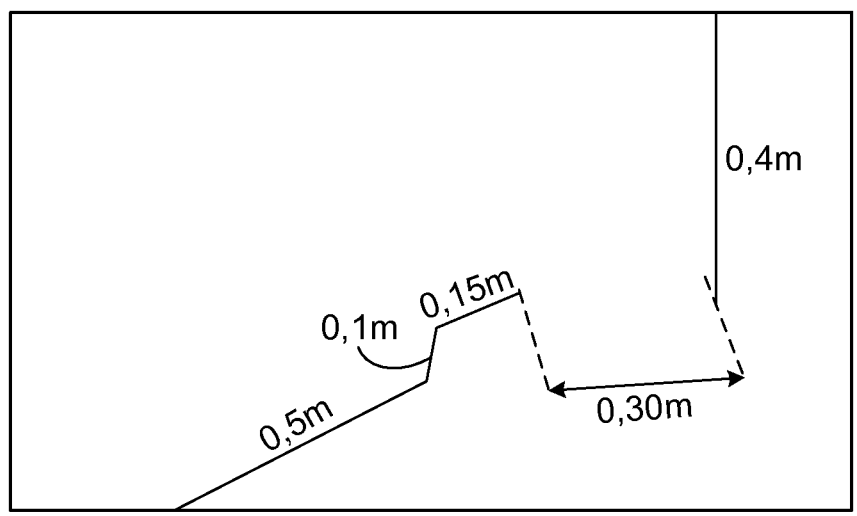

With reference to FIGS. 3a and 3b, an embodiment of the present invention will be described illustrating a procedure of creating a representation of the environment in which a robot operates by using the robot positioning system of the present invention, with respect to which representation the robot can be positioned. The line lasers 13, 14 are controlled to emit light to create a respective vertical laser line 22, 23, while the CMOS camera 12 is operated to repeatedly take pictures. In order to minimize detrimental effects of ambient light, the line lasers are optionally controlled to emit light at a highest possible effect. Further, an optical filter can be arranged in front of the CMOS camera to make the camera more perceptive to the light emitted by the line lasers.

The estimated position of the robot is recorded at the time of taking the respective picture by applying dead reckoning. This is a known method where a current position is calculated by using data pertaining to a previously determined position. Image data of each picture is filtered for noise reduction and a line defining the respective vertical laser lines is extracted using any appropriate edge detection method, such as e.g. the Canny edge detection algorithm. Since the respective line extracted from the image data may be grainy, image processing may be further enhanced by extracting the center of the laser lines present in the picture, using for instance the so called center of gravity method on adjacent pixel values in the respective edge detected laser line to calculate the center of the laser line.

Since a CMOS camera is equipped with a light sensor array, where each individual light sensor (i.e. pixel) in the array represents detected light from a unique position in space, a recorded picture will contain image data representing objects that the line lasers have illuminated, which image data further can be associated with unique coordinates. Subsequently, a list of coordinates where the center of the laser lines runs in the sensor array, i.e. in the recorded picture, is derived. Advantageously, these coordinates will have a much higher resolution then the picture pixels they were extracted from, since each laser line center coordinate is calculated from several pixels and the registered light in all those pixels.

Figure 4:
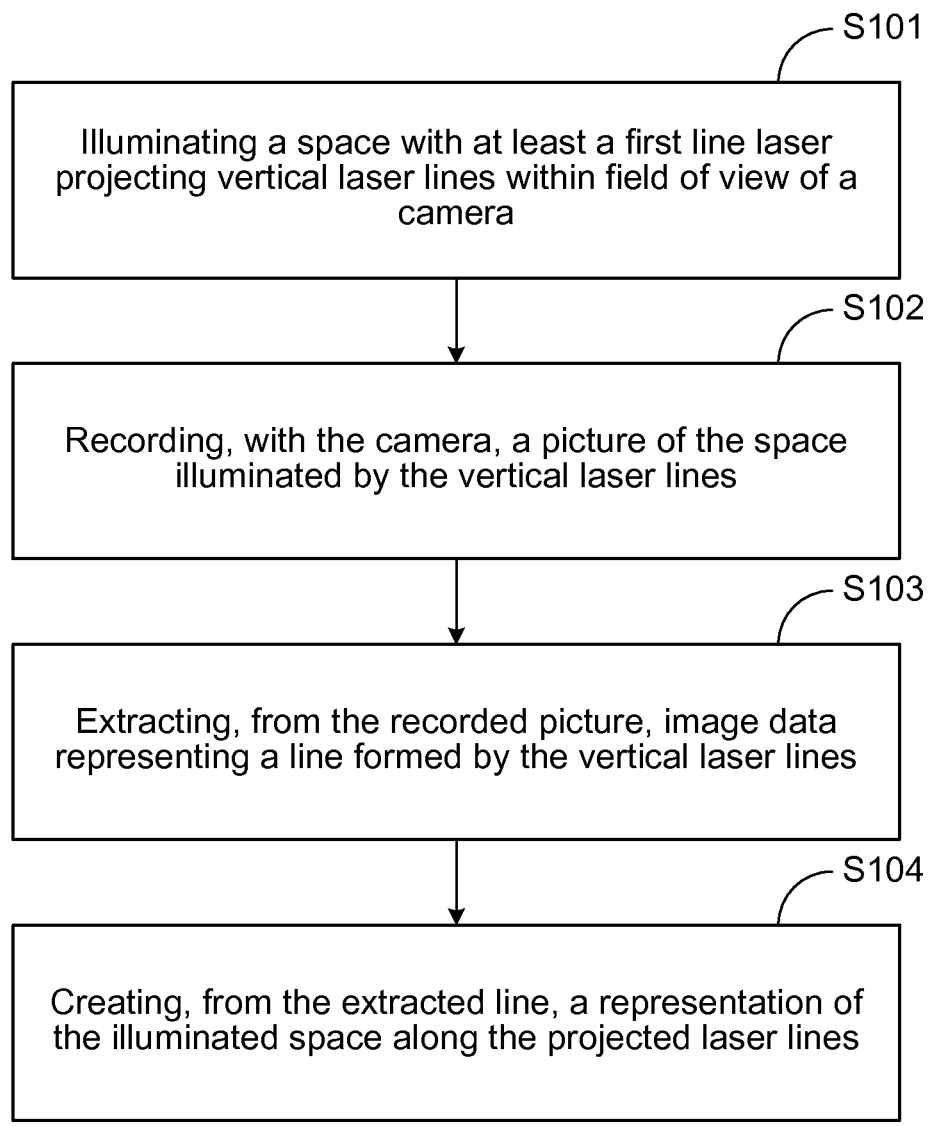
FIG. 4 shows a flowchart of a method of positioning a robot according to an embodiment of the present invention.

With reference to FIGS. 3a and 3b, and the flowchart of FIG. 4 illustrating a method according to an embodiment of the present invention, as the robotic vacuum cleaner 20 moves about a room to be cleaned, the first and second line laser 13, 14 illuminates in step S101 the space 21 in a field of view of the CMOS camera 12 by means of vertical laser lines 22, 23, respectively. The camera 12 records, in step S102, pictures of the illuminated space 21. Thereafter, image data representing a line formed by the respective vertical laser lines 22, 23 are extracted in step S103 from the recorded picture(s), From these extracted line, a representation of the illuminated space along the projected laser lines is created in step S104 since the extracted lines can be associated with unique coordinates in the space 21. A first obstacle in the form of a threshold 31 and a second obstacle in the form of a wall 32 is illuminated by the line lasers. In FIG. 3b, since each individual light sensor of the CMOS camera 12 represents a unique position in space, a recorded picture contains image data which represents illuminated objects and their particular coordinates in the space 21. Thus, the representation of the illuminated space along the projected laser lines will appear as a cross section of the room along the planar surface formed by the emitted laser lines 22, 23. As can be seen the threshold 31 and the wall 32 can be found in FIG. 3b. Further, it can be calculated with high accuracy where the objects are located in the room. For instance, the distance to the threshold 31 is 0.5 m, the threshold is 0.1 m high and 0.15 m wide, and so on. As the position of the robot was recorded when the picture was taken, a plurality of these 2D representation can be transformed into 3D space and used to build a complete 3D map of the room as the robot moves and continuously records further sections of the room.

Figure 5:
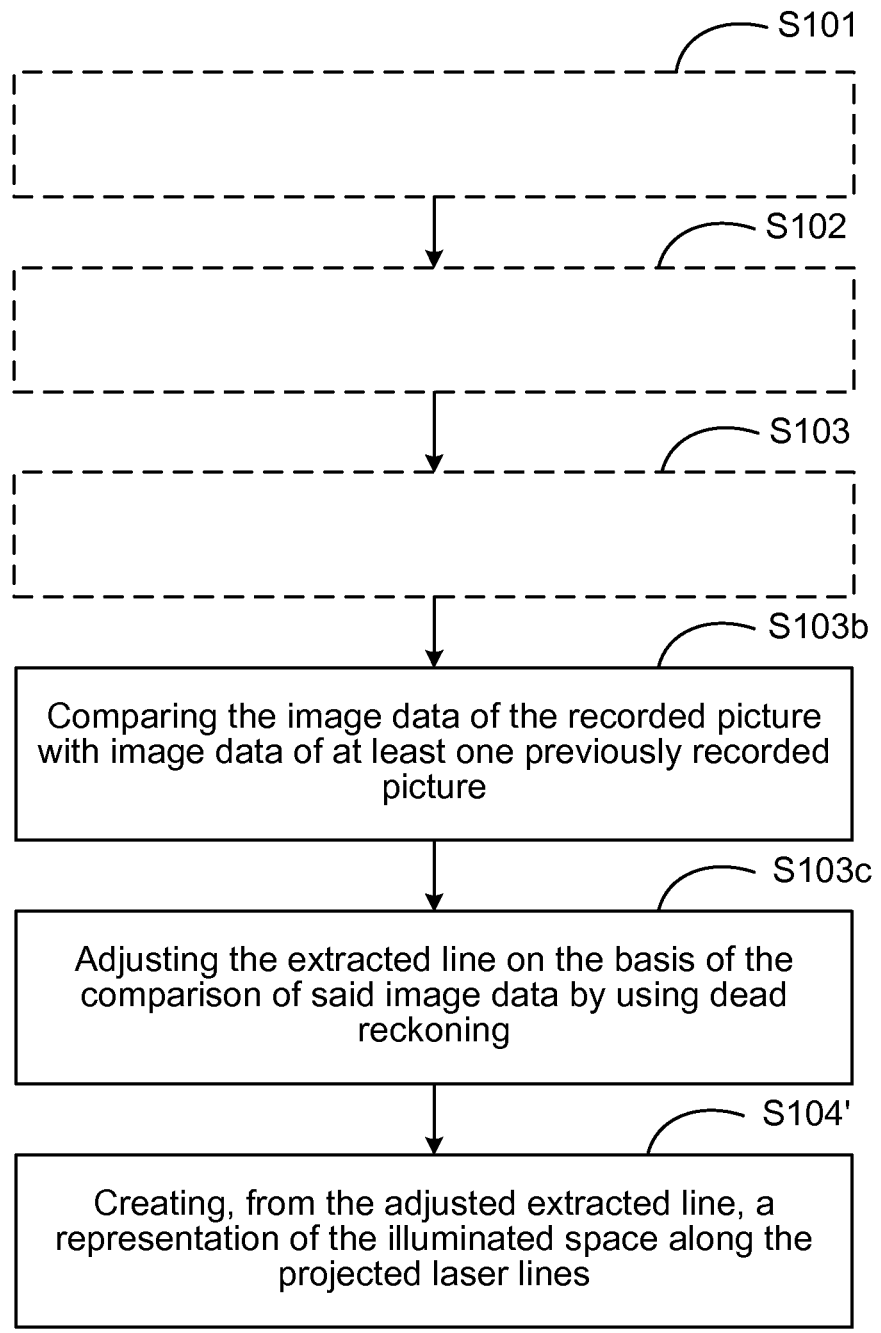
FIG. 5 shows a flowchart of a method of positioning a robot according to another embodiment of the present invention.

FIG. 5 illustrates a method according to a further embodiment of the present invention where the representation is created by means of. Steps S101-S103 are identical to those described with reference to FIG. 4. In an additional step S103b, the image data of the currently recorded picture is compared with image data of at least one previously recorded picture. This could be the directly preceding recorded picture, or an earlier recorded picture. Comparison can be made with even further earlier recorded pictures. Then, in step S103c, the line extracted from the currently recorded picture is adjusted on the basis of the comparison of the different sets of image data by using dead reckoning. Thus, by utilizing knowledge pertaining to previously known positions, a current position can be better estimated, and in case of disturbances (i.e. noise) in the picture, the noise can be filtered out since the noise is not likely to move across the picture in a way that is expected when comparing pictures with known relative movement in relation to each other.

Finally, in step S104', a representation of the illuminated space along the projected laser lines is created from the adjusted extracted line, Thus, by means of comparing currently recorded image data with the representation made from previously recorded image data and applying dead reckoning, a more correct representation can be created, in respect of which the robot can be more accurately positioned.

Optionally, in addition to the extraction of the lines in the picture, the intensity and width of the lines are extracted. The information on the line-width and intensity can be used to filter out lines that are likely to be false. The fluctuation in intensity along a single line might be used as a debris indicator if the line has the position and inclination typical of a floor. Further, in practice, since the robot will tilt slightly back and forth and from side to side as it moves across the floor, image data that is used to generate a representation in the form of a 3D map may have to be adjusted, e.g. by assuming that that the floor on which the robot moves is flat and make a linear adjustment of the image data in the pictures. As a result, long lines that is near-horizontal in 3D space is adjusted to be perfectly horizontal, parameters of deviation for the near-horizontal lines are registered, and the remaining lines are adjusted with the corresponding parameters of deviation.

In case large amounts of data that represent points in 3D space are produced, they can be compressed to reduce the requirements on computation power of the processing unit of the robot positioning system according to embodiments of the present invention. For instance, a number of coherent points in space can be approximated by a line and only the start and stop points of the line are registered in memory and thus represent all the coherent points in space, and a number of coherent lines in space can be approximated by a surface.

Figure 6:
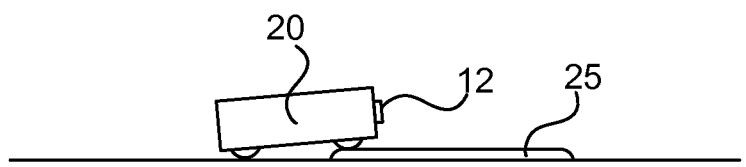
FIG. 6 illustrates a robot positioning system according to a further embodiment of the present invention.

FIG. 6 illustrates a further embodiment of the robot positioning system according to the present invention. When the robotic vacuum cleaner 20 encounters an obstacle, such as a carpet 25, causing it to slightly tilt the created representation may become incorrect, if it is assumed that robotic vacuum is parallel to the surface to be cleaned. This is even more evident in case the robotic vacuum cleaner 20 passes over a doorstep, in which case the robotic vacuum cleaner is capable of performing a tilting action in any direction to move its centre of gravity in order to easier climb over the doorstep. Thus, in this particular embodiment, the representation created is related to the surface across which the robotic vacuum cleaner moves. Hence the created representation is related to a coordinate system which is fixed to the floor and thus become invariant to robot tilt.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of positioning a robot comprising:
    illuminating a space with at least a first line laser projecting vertical laser beams within a field of view of a camera;
    recording, with the camera, a recorded picture of the space illuminated by the vertical laser beams;
    generating an extracted line by extracting, from the recorded picture, image data representing a line formed by the vertical laser beams being reflected against objects located within the space;

comparing the image data of the extracted line of the recorded picture with image data of a previously extracted line of at least one previously recorded picture;

generating an adjusted extracted line by adjusting the extracted line on the basis of the comparison by using dead reckoning; and creating, from the adjusted extracted line, a representation of the illuminated space along the projected laser beams, and an estimate of a position of the robot in relation to the illuminated space.

2. The method of claim 1, wherein:

the step of illuminating a space further comprises illuminating the space with at least a second line laser projecting second vertical laser beams within the field of view of the camera;

the step of generating an extracted line comprises extracting, from the recorded picture, image data representing respective lines formed by the respective vertical laser beams of the first and second line lasers being reflected against objects located within the space;

the step of generating an adjusted extracted line comprises adjusting the respective lines on the basis of the comparison of the image data by using dead reckoning; and the step of creating a representation from the adjusted extracted line comprises creating, from the extracted lines of the first and second line lasers, a representation of the illuminated space along the projected laser beams of the first and second line lasers.

3. The method of claim 1, further comprising:

acquiring a position estimate of the camera; and utilizing the position estimate to create the representation of the illuminated space, the representation being associated with coordinates on the basis of the position estimate.

4. The method of claim 1, further comprising:

rotating the camera around a vertical axis;

repeatedly recording pictures from which the representation is created.

5. The method of claim 2, further comprising:

applying edge detection to the extracted image data in order to identify respective lines formed by the respective reflections of the respective beams of the first and second line lasers.

6. The method of claim 1, further comprising:

mapping the image data to unique sensor array coordinates of the camera; and assigning the unique coordinates to the extracted lines, wherein the representation is associated with the unique coordinates.

7. A robot positioning system comprising:

a camera;

a processing unit; and at least a first line laser arranged to illuminate a space by projecting first vertical laser beams within a field of view of the camera; wherein the camera is arranged to record a picture of the space illuminated by the first vertical laser beams; and the processing unit is configured to extract, from the recorded picture, image data representing a first line formed by the first vertical laser beams being reflected against objects located within the space, compare the image data of the extracted first line of the recorded picture with image data of a previously extracted line of at least one previously recorded picture, adjust the image data representing the first line on the basis of the comparison by using dead reckoning, and create, from the image data representing the first line, a representation of the illuminated space along the projected first vertical laser beams and an estimation of a position of the robot in relation to the illuminated space.

8. The robot positioning system of claim 7, further comprising:

a second line laser arranged to illuminate the space within the field of view of the camera by projecting second vertical laser beams; wherein the processing unit is arranged to extract, from the recorded picture, image data representing a respective lines formed by the first and second vertical laser beams and further to create, from the respective extracted lines, a representation of the illuminated space along the projected first and second vertical laser beams.

9. The robot positioning system of claim 8, wherein the first and second line lasers are arranged on respective sides of the camera along an axis that is perpendicular to an optical axis of the camera.

10. The robot positioning system of claim 9, wherein the first and second line lasers are arranged such that the first and second vertical laser beams intersect within the field of view of the camera.

11. The robot positioning system of any one of claim 8, wherein the directions of the first and second vertical laser beams and the field of view of the camera are arranged such that a width (wC) of the illuminated space located within the field of view of the camera is greater than a width (wR) of the robot on which the robot positioning system is arranged.

12. The robot positioning system of any one of claim 8, wherein the directions of the first and second vertical laser beams and the field of view of the camera are arranged such that a height (hC) of the illuminated space located within the field of view of the camera is greater than a height (hR) of the robot on which the robot positioning system is arranged.

13. The robot positioning system of any one of claim 7, further comprising:

an optical filter arranged at the camera, which optical filter is adapted to a wavelength of the light emitted by the first and second line laser.

14. The robot positioning system of claim 7, wherein the camera and the first line laser are mounted on a robot and arranged to be rotatable around a vertical axis.

15. The robot positioning system of claim 7, further comprising a positioning system for estimating an instantaneous position of the robot positioning system.

16. The robot positioning system of claim 15, wherein the processing unit is further configured to:

utilize the position estimate to create the representation of the illuminated space, the representation being associated with coordinates on the basis of the position estimate.

17. The robot positioning system of claim 8, wherein the processing unit is further configured to:

apply edge detection to the extracted image data in order to identify the respective lines formed by the reflections of the first and second vertical laser beams.

18. The robot positioning system of claim 7, wherein the processing unit is further configured to:

map the image data to unique sensor array coordinates of the camera; and assign the unique coordinates to the extracted lines, wherein the representation is associated with the unique coordinates.

19. The robot positioning system of claim 8, further comprising:
   a dust sensor arranged to detect particles illuminated by the first and second line lasers by extracting image data indicating the illuminated particles, wherein operation of a robot on which robot positioning system is arranged is controlled in response to the detection of particles by the dust sensor.

20. The robot positioning system of claim 7, wherein the processing unit is further configured to relate the created representation to a coordinate system which is fixed to a surface across which a robot associated with the robot positioning system moves.

* * * * *